United States Patent [19]

Clopton

[11] Patent Number: 5,398,802
[45] Date of Patent: Mar. 21, 1995

[54] PALLET CONVEYOR AND METHOD OF CONVEYING PALLETS

[75] Inventor: Robert T. Clopton, Magnolia, Ky.

[73] Assignee: Simplimatic Engineering Company, Lynchburg, Va.

[21] Appl. No.: 126,924

[22] Filed: Sep. 27, 1993

[51] Int. Cl.⁶ .............................................. B65G 29/00
[52] U.S. Cl. ................... 198/465.1; 198/343.2
[58] Field of Search .............. 198/343.1, 343.2, 345.3, 198/465.1, 465.2, 803.01, 803.2

[56] References Cited

U.S. PATENT DOCUMENTS

| | | |
|---|---|---|
| 3,088,197 | 5/1963 | Cargill . |
| 3,666,076 | 5/1972 | Miller et al. . |
| 3,805,942 | 4/1974 | Auernhammer . |
| 3,934,701 | 1/1976 | Mooney et al. . |
| 3,949,859 | 4/1976 | Nussbaumer et al. ........ 198/803.2 X |
| 4,088,220 | 5/1978 | Jacksch et al. .............. 198/343.2 X |
| 4,164,391 | 8/1979 | Howard et al. . |
| 4,461,216 | 7/1984 | Carney ......................... 198/465.1 X |
| 4,519,491 | 5/1985 | Prodel et al. ................ 198/465.1 X |
| 4,527,611 | 7/1985 | Clark . |
| 4,530,287 | 7/1985 | Sticht . |
| 4,924,777 | 5/1990 | Linton et al. ................. 198/465.1 X |
| 4,961,492 | 10/1990 | Wiseman et al. . |
| 5,065,678 | 11/1991 | Rhodes ......................... 198/465.1 X |
| 5,078,254 | 1/1992 | Colonius et al. . |
| 5,222,587 | 6/1993 | Chevalier et al. ................ 198/465.1 |

FOREIGN PATENT DOCUMENTS 0567588 8/1977 U.S.S.R. ............................ 198/343.1

*Primary Examiner*—James R. Bidwell
*Attorney, Agent, or Firm*—St. Onge Steward Johnston & Reens

[57] ABSTRACT

A pallet conveyor is provided comprising a pallet having a tab movable between a retracted position and an extended position, a conveying surface for receiving the pallet to transport it along a conveyor path to a workstation, and an actuator along portions of the conveyor path for moving the tab to the extended position to connect the pallet to the conveying surface for transport along the portions while permitting accumulation of the pallet at workstations with the tab in the retracted position. In another aspect the invention comprises a method of conveying pallets.

10 Claims, 4 Drawing Sheets

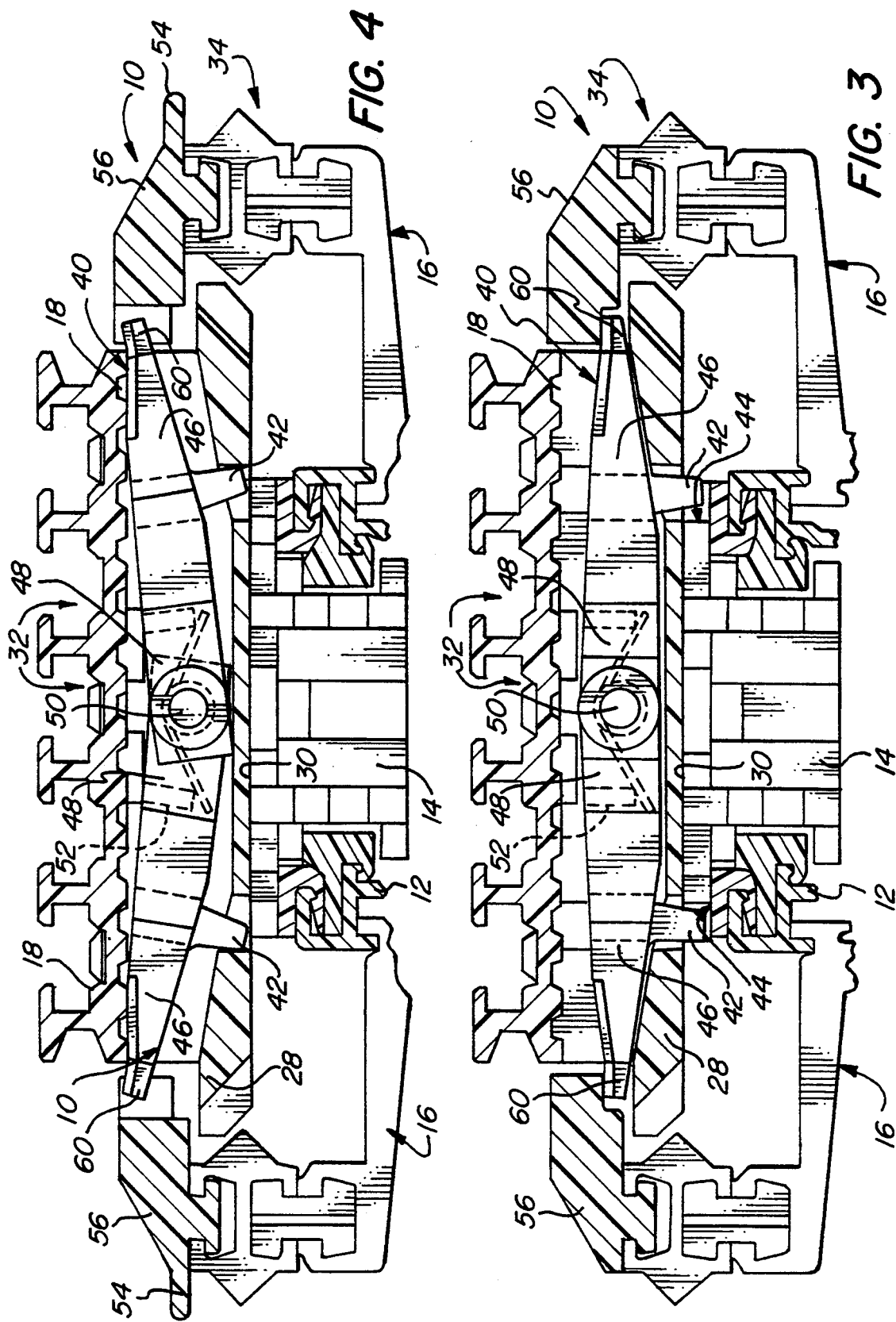

PALLET CONVEYOR AND METHOD OF CONVEYING PALLETS

FIELD OF THE INVENTION

The invention relates to conveyors, and more particularly, to conveyors for moving pallets between workstations.

BACKGROUND OF THE INVENTION

Prior art pallet conveyors generally have two different modes of operation: synchronous and asynchronous systems. In known synchronous pallet conveyors, the conveyor is intermittently driven to intermittently move pallets between workstations. Synchronous pallet conveyors may be relatively simple to make and use since the pallets are typically frictionally conveyed, no stop mechanism is typically used, and pallets are generally not disengaged or removed from the conveyor at the workstations. A disadvantage of synchronous systems is that the throughput speed of the conveyor line is limited to the throughput speed of the slowest workstation. Another disadvantage is that the frequent starting and stopping may unduly wear the conveyor drive mechanism.

Asynchronous pallet conveyors, which are also known, reduce the wear associated with intermittent use of the conveyor drive mechanism by providing a continuously driven conveyor. U.S. Pat. No. 3,088,197 to Cargill, U.S. Pat. No. 3,666,076 to Miller, and U.S. Pat. No. 3,934,701 to Mooney all disclose asynchronous pallet conveyors.

In Cargill, a clutch mechanism freewheels a pinion permitting accumulation or stopping of pallets conveyed between workstations by a continuously moving conveyor.

Miller provides a boss on the pallets for engaging notches on a continuous conveyor band. A cam surface disengages the boss for accumulation or stopping at a workstation.

Mooney discloses an indexing machine in which pallets have a cam follower which is received in a path to release a latch holding the pallet to the conveyor and thus removing the pallet from the conveyor at the workstation. Mooney also provides for deceleration of pallets upon removal from the conveyor and acceleration of pallets in order to reduce wear associated with the latch which holds the pallet to the continuously moving conveyor.

U.S. Pat. No. 3,805,942 to Auerhammer discloses a selective synchronous, nonsynchronous transfer machine having an intermittently driven conveyor including subpallets carried thereon, and workpiece pallets releasably latchable to the subpallets for conveyance between workstations.

Although asynchronous systems may improve overall throughput speed of conveyor lines by enabling accumulation of pallets at each workstation, accumulation may disadvantageously require relatively complicated mechanisms which either remove or disengage pallets from the continuously driven conveyors. Moreover, most of the engaging mechanisms are activated on both the horizontal and sloped sections of the conveyor.

What is desired, therefore, is a pallet conveyor which permits accumulation of pallets without use of a complicated mechanism for disengaging or removing the pallet from the conveyor, and which also enables pallets to be transported along sloped sections of a conveyor line by engaging the conveyor. It is further desirable that the pallet be moving at substantially the same speed as the conveyor when the pallet engages the conveyor to reduce wear on the engaging mechanism.

SUMMARY OF THE INVENTION

Accordingly, it is an object of the invention to provide a pallet conveyor which frictionally conveys pallets to permit accumulation of pallets at workstations.

It is another object of the invention to provide a pallet conveyor in which a pallet engages the conveyor a minimal amount of time so as to avoid wear on the engaging apparatus.

An additional object of the invention is to provide a pallet conveyor in which pallets engage the conveyor along sloping sections of a conveyor line.

A further object of the invention is to provide a pallet conveyor in which pallets engage the conveyor when the pallets are moving at substantially the same speed as the conveyor.

Yet another object of the invention is to provide a pallet conveyor of the above character in which the pallets include tabs for engaging the conveyor.

Still another object of the invention is to provide a pallet conveyor of the above character in which the pallet tabs include a cam follower operated by a cam surface.

A still further object of the invention is to provide a pallet conveyor of the above character in which the cam surface is provided by a guide rail for guiding pallets along the conveyor line.

These and other objects are achieved by provision of a pallet conveyor comprising a pallet having a tab movable between a retracted position and an extended position, a conveying surface for receiving the pallet to transport it along a conveyor path to a workstation, and an actuator along portions of the conveyor path for moving the tab to the extended position to connect the pallet to the conveying surface for transport along the portions while permitting accumulation of the pallet at workstations with the tab in the retracted position. Preferably, the tab is biased to the retracted position. The tab is preferably pivotally mounted within the pallet, and most preferably comprises an integral lever. The conveying surface includes recesses for receiving the tab.

The actuator preferably comprises a cam surface for contacting the tab. Most preferably the cam surface is comprised in a guide rail for guiding pallets along the path.

In another aspect, the invention provides a method of conveying pallets comprising the steps of placing a pallet on a conveyor, moving the conveyor to transport a pallet along a conveyor path to a workstation, accumulating the pallet at the workstation by stopping the pallet while continuing to move the conveyor, and connecting the pallet to the conveyor at a portion of the conveyor path which slopes to an extent that the pallet can not readily be conveyed by contact with the conveyor.

The connecting step preferably comprises moving a pallet tab from a retracted to an extended position in engagement with the conveyor. The moving step preferably comprises camming the pallet tab to the extended position.

The invention and its particular features and advantages will become more apparent from the following

BRIEF DESCRIPTION OF THE DRAWINGS

FIG. 3 is a cross sectional view of the pallet conveyor of FIG. 1 showing the tabs held in the extended position by the guide rail.

FIG. 4 is a cross sectional view of the pallet conveyor of FIG. 1 similar to FIG. 3 but showing the tabs in the retracted position and including guide rails whose sole function is guiding the pallets.

DETAILED DESCRIPTION OF THE DRAWINGS

Figure 1:
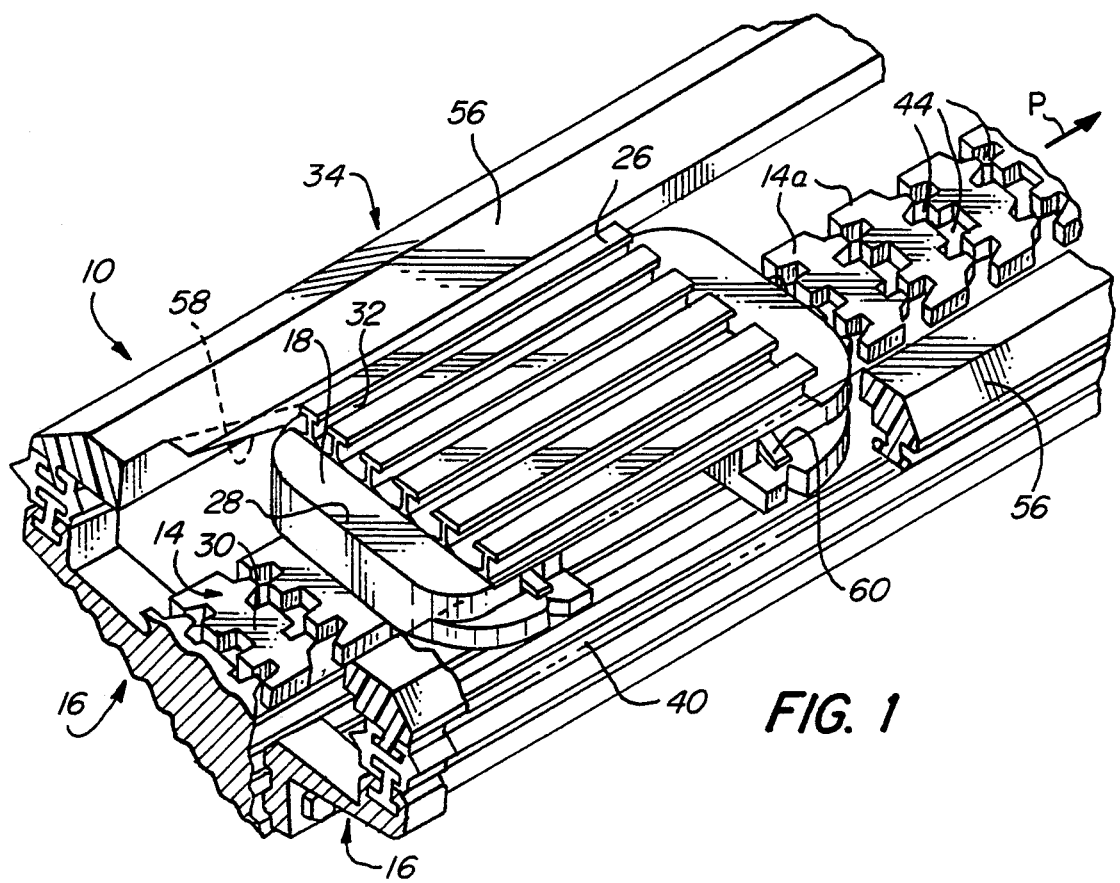
FIG. 1 is a partial front isometric view of a sloped portion of a pallet conveyor constructed in accordance with the present invention.
Figure 2:
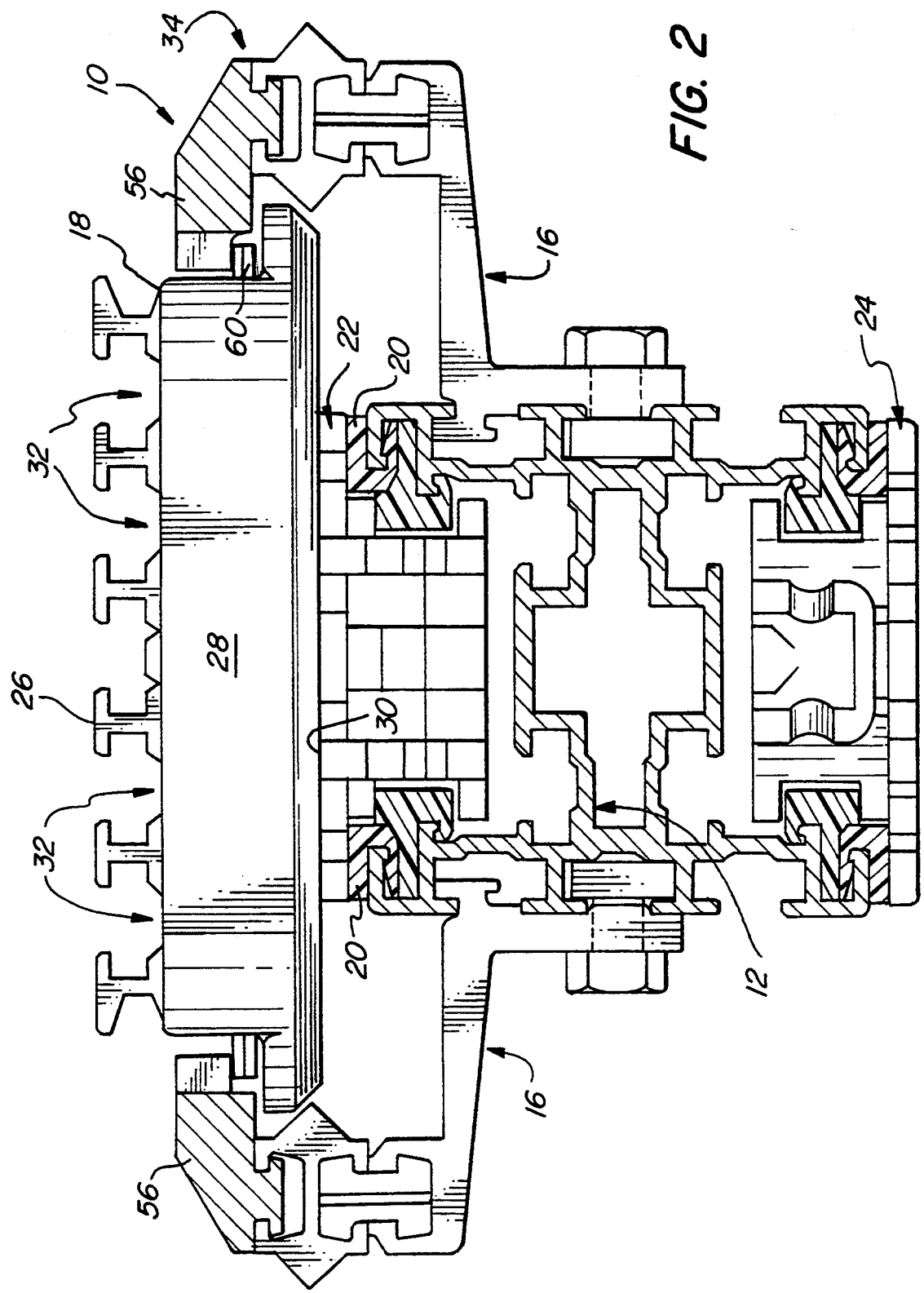
FIG. 2 is an end view of the pallet conveyor of FIG. 1.

Referring to FIGS. 1–5, a pallet conveyor 10 in accordance with the invention is shown. Pallet conveyor 10 generally comprises a conveyor beam 12 (see FIG. 2), a conveyor chain 14, guide rail support assemblies 16 mounted to the beam, and a pallet 18. Chain 14 circulates around beam 12 to transport pallets 18 along conveyor path P between workstations (not shown). Beam 12 and guide rail support assemblies 16 are disclosed in U.S. Pat. No. 5,137,145. Referring to FIG. 2, chain 14 rides on wearstrips 20 such as those disclosed in U.S. Pat. Nos. 4,961,492 and 5,137,145.

It is understood that chain 14 may include transport 22 and return 24 runs as illustrated, or may be provided as a closed transport path (not shown). Chain 14 may also be replaced by a belt, a band, a different chain or a motor conveyor. Chain 14 is continuously circulated by a motor (not shown) but may also be intermittently driven if desired.

Guide rail assemblies 16 support guide rails for guiding pallet 18 along conveyor path P. Pallets 18 are generally used for mounting workpieces (not shown) to be delivered to successive workstations. In this regard, pallets 18 include a workpiece mounting or carrying section 26 which may be of any desired length and shoes or end caps 28.

Shoes 28 are made of UHMW plastic or a similar wear resistant material. Chain 14 is also made of a similar material and shoes 28 are the only portions of pallets 18 which contact conveying surface 30 in order to reduce wear on both.

Workpiece mounting section 26 is extruded aluminum and includes a plurality of mounting slots 32 for attaching workpieces. Mounting section 26 may be provided as another material but is conveniently formed substantially the same as beam 12.

Figure 5:
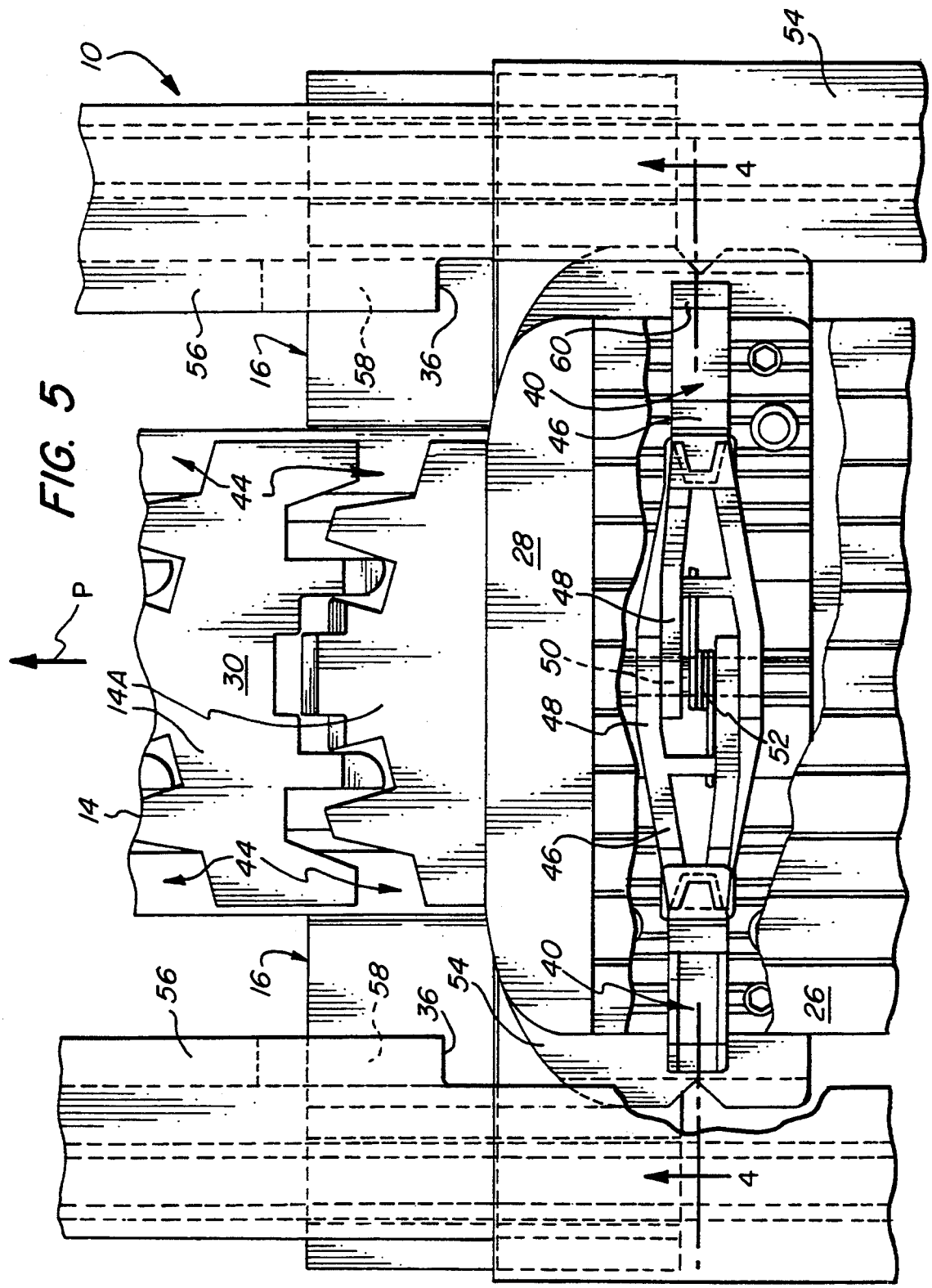
FIG. 5 is a partial top plan view of the pallet conveyor of FIG. 1 as the pallet is about to reach a sloped portion of the conveyor path.

FIGS. 1, 2 and 3 illustrate pallet conveyor 10 along a portion 34 of conveyor path P wherein pallet 18 is connected to surface 30 for transport. FIGS. 4 and 5 illustrate pallet conveyor 10 at transition point 36 between a portion of conveyor path P wherein pallet 18 is transported by contact between shoes 28 and conveying surface 30, and portion 34 wherein pallet 18 is connected to conveying surface 30 for transport.

Portions 34 of conveyor path P are sections along which pallet 18 can not readily be conveyed through contact with surface 30, or frictionally conveyed. Generally, these are sloped sections of the conveyor path, as illustrated is FIG. 1, although other reasons may also exist such as path curves or transfers (not shown). The sloped sections may be inclines up which pallet 18 cannot be conveyed or declines down which pallet 18 uncontrollably slides. It is understood that the degree of slope necessary to define path portion 34 may depend upon a number of factors including: conveyor material, surface area, finish, and speed; pallet material, surface area, finish, size weight; workpiece size and weight; and other factors.

Referring to FIG. 3, pallet 18 is connected to conveyor 14 along portion 34 of conveyor path P by a conveyor engaging mechanism 40. Although a mechanical means is disclosed for mechanism 40, it is understood that other means including but not limited to frictional, electrical, hydraulic, magnetic and similar means may also be used to removably connect pallet 18 to conveyor surface 30 for transport. Mechanism 40 comprises a tab 42 pivotally mounted to pallet 18 and movable for insertion to a hole or recess 44 in conveying surface 30. Where conveyor 14 is a chain, as illustrated, recess 44 conveniently comprises the gap between successive links 14a (see FIG. 1). It is understood that mechanism 40 may also be mounted to chain 14 for engagement with a hole or recess in pallet 18.

Referring to FIGS. 3 and 4, tabs 42 are movable between a retracted position out of contact with conveyor 14 (shown in FIG. 4) and an extended position capable of connection to conveyor 14 (shown in FIG. 3). In the extended position, tabs 42 fit into corresponding holes 44 in conveyor 14 with pallet 18 resting on conveying surface 30.

Each tab 42 is connected and preferably integrally formed in one piece with a lever 46. Levers 46 are mounted for rotation at first ends 48 on a shaft or pin 50 within pallet 18. First ends 48 comprise yokes (see FIG. 5) for mounting to shaft 50 at two points. A spring 52 biases levers 46 to first positions holding tabs 42 at retracted positions out of contact with conveyor 14 (FIG. 4). Levers 46 are rotatable to second positions to move tabs 42 between the retracted position and an extended position in which tab 42 is connected to conveyor 14 with pallet 18 contacting conveying surface 30.

Along portions of conveyor path P illustrated in FIG. 4 and 5, conveyor engaging mechanism 40 is not actuated, tabs 42 are retained in the retracted position, and pallet 18 is transported by contact with conveying surface 30. Movement of tabs 42 between the retracted and extended positions is accomplished by manipulating or rotating levers 46.

Pallet conveyor 10 includes guide rails 54, 56 mounted on guide rail support assemblies 16. Guide rails 54, 56 guide pallets 18 along conveyor path P by occasionally contacting shoes 28 of pallets 18 to retain the pallets on conveyor surface 30. Guide rails 54 lie along portions of conveyor path P illustrated in FIG. 4 and 5 and guiding pallets 18 is their sole function. Guide rails 56, however, which lie along portions 34 of conveyor path P are cam guides and serve a second function of actuating conveyor engaging mechanism 40, that is moving tab 42 from the retracted position (FIG. 4) to the extended position (FIGS. 2, 3). Although cam guide 56 is a mechanical actuating or tab moving means, it is understood that electrical, magnetic, hydraulic and other mechanical means may also be used.

Figure 1A:
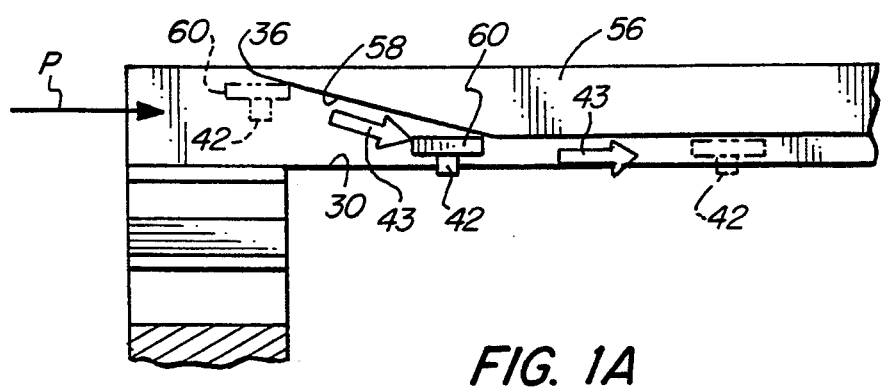
FIG. 1A is a partial enlarged side schematic view of the pallet conveyor of FIG. 1 illustrating movement of a pallet tab from a retracted to an extended position by contact with a guide rail cam surface.

Referring particularly to FIG. 1A, operation of cam guide 56 is schematically depicted as pallet 18 reaches transition point 36 between portions 34 and 38 of conveyor path P (see also FIG. 5). Cam guides 56 include cam surfaces 58 which receive second ends 60 of levers 46 to move or rotate the levers to the second position thereby moving tabs 42 from the retracted to the extended position and connecting pallets 18 to conveyor 14 for transport. In dashed lines, tab 42 is illustrated in the retracted position at left and the fully extended position at right. In solid lines, tab 42 is illustrated in its position on pallet 18 of FIG. 1. Tab 42 moves in the direction of arrows 43 from the retracted to the fully extended position. It is understood that as many tabs, levers and corresponding cam guides as necessary may be used to transport pallets along path portions 34 or around curves or the like. It is also understood that where mechanism 40 is mounted to chain 14, it may also be actuated by cam guide 56 with the added advantage that pallet 18 is not trapped on conveyor chain 14.

At transition point 36, pallets are moving along path P at substantially the same speed as conveyor 14, thus pallets 18 may be connected to conveyor surface 30 without a clutching mechanism and thus without the wear and consequent replacement expense associated with such parts. Pallet 18 continues to be connected to conveying surface 30 so long as guide rails 56 hold lever 46 in the second position against bias from spring.

Once pallet 18 has been connected to conveyor 14, it may continue to be transported in this fashion regardless of the contour of conveyor path P until pallet 18 reaches a workstation or otherwise needs to be accumulated or stopped while conveyor 14 continues to advance. Pallet 18 is readily disconnected to from conveyor 14 by replacing cam guide 56 with a guide rail 54 (see FIG. 4) that does not include a cam surface 58.

It is understood that levers 46 could be spring biased such that tabs 42 are in the extended position. Accordingly, the cam guide could be adapted to move the tabs to the retracted position.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A pallet conveyor comprising:
   a pallet for carrying workpieces, said pallet having at least one tab mounted therein in a retracted position and movable between the retracted position and an extended position;
   a conveying surface for receiving said pallet and for transporting said pallet along a conveyor path when said tab is in the retracted position;
   a guide rail, mounted adjacent to and on a pallet receiving side of said conveying surface, for guiding said pallet along the conveyor path; and
   a cam surface on said guide rail in the region of a sloped portion of the conveyor path, said cam surface for moving said tab to the extended position to connect said pallet to said conveying surface for transporting said pallet along the sloped portion of the conveyor path, whereby said pallet may be accumulated without removing it from said conveying surface and also may be transported along the sloped portion of the conveying path.

2. The pallet conveyor of claim 1 wherein said conveying surface includes holes for receiving said tab.

3. The pallet conveyor of claim 1 wherein said tab is pivotally mounted within said pallet and wherein said cam surface rotates said tab from the retracted position toward the extended position.

4. The pallet conveyor of claim 1 wherein said tab comprises an integral lever pivotally mounted to said pallet such that the contact of said lever by said cam surface causes said tab to move toward the extended position.

5. The pallet conveyor of claim 4 wherein said lever comprises a yoke for pivotally mounting said lever to a shaft within said pallet.

6. A pallet conveyor comprising:
   a pallet;
   a conveying surface for receiving said pallet and for transporting said pallet along a conveyor path to a workstation;
   a tab mounted to said pallet in a retracted position permitting said pallet to be stopped at the workstation without stopping the conveying surface; and
   A guide rail, adjacent said conveying surface along a portion of the conveyor path at which said pallet can not readily be conveyed by contact with said conveying surface, for guiding said pallet along the conveyor path and for moving said tab to an extended position to connect said pallet to said conveying surface and transport said pallet along the portion of the conveyor path.

7. The pallet conveyor of claim 6 wherein said guide rail comprises a cam surface for contacting said tab to move it toward the extended position.

8. The pallet conveyor of claim 6 wherein said tab is pivotally mounted within said pallet.

9. The pallet conveyor of claim 6, wherein said tab is spring-biased to the retracted position.

10. The pallet conveyor of claim 6 wherein said conveying surface comprises recesses for receiving said pallet tab.

* * * * *